(12) United States Patent
Sivanandan et al.

(10) Patent No.: US 10,879,564 B2
(45) Date of Patent: Dec. 29, 2020

(54) POLAR CYCLICSILOXANES AS HIGH VOLTAGE STABLE ELECTROLYTES FOR LITHIUM BATTERIES

(71) Applicant: Robert Bosch GmbH, Stuttgart (DE)

(72) Inventors: Kulandaivelu Sivanandan, Fremont, CA (US); Natasha Bugna Teran, Foster City, CA (US); Hany Basam Eitouni, Oakland, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 209 days.

(21) Appl. No.: 15/907,231

(22) Filed: Feb. 27, 2018

(65) Prior Publication Data

US 2018/0248224 A1    Aug. 30, 2018

Related U.S. Application Data

(60) Provisional application No. 62/464,967, filed on Feb. 28, 2017.

(51) Int. Cl.
*H01M 10/0565* (2010.01)
*H01M 10/0525* (2010.01)
(Continued)

(52) U.S. Cl.
CPC ........... *H01M 10/0565* (2013.01); *C07F 7/21* (2013.01); *H01M 4/131* (2013.01); *H01M 4/505* (2013.01); *H01M 4/525* (2013.01); *H01M 4/62* (2013.01); *H01M 10/052* (2013.01); *H01M 10/0525* (2013.01); *H01M 4/382* (2013.01);
(Continued)

(58) Field of Classification Search
CPC ......... H01M 10/0565; H01M 10/0525; H01M 4/131; H01M 4/505; H01M 4/525; H01M 10/052; H01M 4/386; H01M 4/62; H01M 4/382; H01M 4/405; H01M 4/5825; H01M 4/485; H01M 2300/0082; H01M 2004/028; H01M 2300/0094; H01M 4/587; C07F 7/21
See application file for complete search history.

(56) References Cited

U.S. PATENT DOCUMENTS

2004/0214090 A1* 10/2004 West .................. H01M 4/62
429/311
2007/0059597 A1* 3/2007 Nakanishi ............ C08G 77/045
429/188

(Continued)

FOREIGN PATENT DOCUMENTS

WO    2009146340 A1    12/2009

OTHER PUBLICATIONS

X.J. Wang et al. / Electrochemistry Communications 12 (2010) 386-389 (Year: 2010).*

(Continued)

*Primary Examiner* — Alexander Usyatinsky
(74) *Attorney, Agent, or Firm* — Brooks Kushman P.C.

(57) ABSTRACT

Polar cyclicsiloxane materials with various functionalities are disclosed. When combined with lithium salts, such materials can be useful as electrolyte materials in lithium battery cells. They may be used alone as electrolytes or as additives in other polymer electrolytes. Various lithium battery cell configurations that can employ such polar cyclicsiloxane materials are also described.

13 Claims, 5 Drawing Sheets

(51) Int. Cl.
  *H01M 4/505* (2010.01)
  *H01M 4/525* (2010.01)
  *C07F 7/21* (2006.01)
  *H01M 4/131* (2010.01)
  *H01M 4/62* (2006.01)
  *H01M 10/052* (2010.01)
  *H01M 4/02* (2006.01)
  *H01M 4/485* (2010.01)
  *H01M 4/38* (2006.01)
  *H01M 4/40* (2006.01)
  *H01M 4/58* (2010.01)
  *H01M 4/587* (2010.01)

(52) U.S. Cl.
  CPC ............ *H01M 4/386* (2013.01); *H01M 4/405* (2013.01); *H01M 4/485* (2013.01); *H01M 4/587* (2013.01); *H01M 4/5825* (2013.01); *H01M 2004/028* (2013.01); *H01M 2300/0082* (2013.01); *H01M 2300/0094* (2013.01)

(56) References Cited

U.S. PATENT DOCUMENTS

| | | | | |
|---|---|---|---|---|
| 2008/0171267 | A1* | 7/2008 | Kang | C07F 7/21 429/313 |
| 2010/0015514 | A1* | 1/2010 | Miyagi | H01M 10/052 429/129 |
| 2015/0171475 | A1* | 6/2015 | Kondo | H01M 10/0567 429/332 |
| 2015/0188141 | A1* | 7/2015 | Yamaguchi | H01M 10/052 429/341 |
| 2016/0028114 | A1* | 1/2016 | Pratt | H01B 1/122 429/309 |
| 2016/0156066 | A1* | 6/2016 | Gleason | H01M 4/13 429/311 |
| 2016/0229960 | A1* | 8/2016 | Watanabe | C07F 7/188 |
| 2017/0352918 | A1* | 12/2017 | Sivanandan | H01M 10/052 |

OTHER PUBLICATIONS

Amine, "Novel silane compounds as electrolyte solvents for Li-ion batteries," Electrochemistry Communications 8 (2006) 429-433.

Chenghong Li, "Preparation of Nitrile Containing Siloxane Triblock Copolymers and Their Application As Stabilizers for Siloxane Magnetic Fluids," Master's Degree Thesis, Virginia Polytechnic Institute and State University, Blacksburg, VA, Dec. 11, 1996.

International Search Report for International application No. PCT/US2018/020048.

Kang, "Ionic conductivity and electrochemical properties of cross-linked solid polymer electrolyte using star-shaped siloxane acrylate," Journal of Power Sources 165 (2007) 92-96.

Pohl, "Highly Thermal and Electrochemical Stable Dinitrile Disiloxane as Co-Solvent for Use in Lithium-Ion Batteries," Journal of the Electrochemical Society, 162 (3) A460-A464 (2015).

Pohl, "Nitrile functionalized disiloxanes with dissolved LiTFSI as lithium ion electrolytes with high thermal and electrochemical stability," Journal of Power Sources 274 (2015) 629-635.

Pohl, "Nitrile functionalized silyl ether with dissolved LiTFSI as new electrolyte solvent for lithium-ion batteries," Electrochimica Acta 180 (2015) 795-800.

Yong, "Organosilicon compounds containing nitrile and oligo(ethylene oxide) substituents as safe electrolytes for high-voltage lithium-ion batteries," Journal of Power Sources 254 (2014) 29-32.

\* cited by examiner

POLAR CYCLICSILOXANES AS HIGH VOLTAGE STABLE ELECTROLYTES FOR LITHIUM BATTERIES

CROSS-REFERENCE TO RELATED APPLICATIONS

This application claims priority to U.S. Provisional Patent Application 62/464,967, filed Feb. 28, 2017, which is incorporated by reference herein.

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (lithium nickel cobalt aluminum oxide) and NCM (lithium nickel cobalt manganese oxide) in order to exploit their potentially high gravimetric energy densities (as high as 300-500 Wh/kg), their good rate capabilities and their long-term stability. Cells made with such oxidic materials often operate at higher voltages (e.g., as high as 4.5V) than do cells with olivine cathode materials such as LFP (lithium iron phosphate) (e.g., 3.6-3.8V). Electrolytes that have been stable at the lower voltages of LFP cells may have difficulty operating at the higher voltages, especially in the cathode. Degradation, in the form of oxidation, may lead to capacity fade early in the life of a cell.

Thus, there is a need to develop electrolytes that are especially well-suited to operate in the high voltage conditions that are made possible by next generation cathode materials.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

In one embodiment of the invention, a composition of matter that is a di-functional polar cyclic siloxane is disclosed. The di-functional polar cyclic siloxane has the following structure:

in which P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n is any integer from 2 to 20; and x is any integer from 1 to 10.

In another embodiment of the invention, the di-functional polar cyclic siloxane also contains an electrolyte salt, and the di-functional polar cyclic siloxane is an electrolyte material.

In another embodiment of the invention, a composition of matter that is a co-functional polar cyclic siloxane is disclosed. The co-functional polar cyclic siloxane is a mixture of mono-functional and di-functional polar cyclic siloxanes and has the following structure:

in which R is a saturated or unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, or anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n and m are integers, and the sum of n and m is any integer from 2 to 20; and x is any integer from 1 to 10.

In another embodiment of the invention, the co-functional polar cyclic siloxane also contains an electrolyte salt, and the co-functional polar cyclic siloxane is an electrolyte material.

In another embodiment of the invention, a composition of matter that is a mixed co-functional polar cyclic siloxane is disclosed. The mixed co-functional polar cyclic siloxane is a mixture of unfunctionalized and difunctional polar cyclicsiloxanes with the following structure:

in which R is a saturated or unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, or anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n and m are integers, and the sum of n and m is any integer from 2 to 20; and x is any integer from 1 to 10.

In another embodiment of the invention, the mixed co-functional polar cyclic siloxane also contains an electrolyte salt, and the mixed co-functional polar cyclic siloxane is an electrolyte material.

In another embodiment of the invention, an electrolyte material is disclosed. The electrolyte material contains an electrolyte salt and a mono-functional polar cyclic siloxane with the following structure:

in which R is a saturated or unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, or anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n is any integer from 2 to 20; and x is any integer from 1 to 10.

In various arrangements, for all the structures shown herein, the R groups may or may not be the same in all siloxane units. In various arrangements, for all the structures shown herein, the P groups may or may not be the same in all siloxane units.

In another embodiment of the invention, an electrolyte material includes a solid polymer electrolyte that has an additive. The additive contains an electrolyte salt and any of the polar cyclicsiloxane-based materials disclosed herein.

In another embodiment of the invention, a positive electrode (or cathode) includes a positive electrode active material; and a catholyte comprising a lithium salt and any of the polar cyclicsiloxane-based electrolyte disclosed herein. The positive electrode active material may be any of lithium nickel cobalt aluminum oxide or lithium nickel cobalt manganese oxide. The positive electrode may also contain one or more electronically-conductive additives.

In another embodiment of the invention, an electrochemical cell includes an anode configured to absorb and release lithium ions; a cathode as the positive electrode described above; a current collector adjacent to an outside surface of the cathode; and a separator region between the anode and the cathode. The separator region contains a separator electrolyte that is configured to facilitate movement of lithium ions back and forth between the anode and the cathode. The first catholyte contains a lithium salt and any of the polar cyclicsiloxane-based electrolytes described herein.

The first catholyte may further contain a solid polymer electrolyte. The first catholyte and the separator electrolyte may be the same. The separator electrolyte may contain a solid polymer electrolyte.

In one arrangement, there is an overlayer between the cathode and the separator region. The overlayer contains a second catholyte that may or may not be a solid polymer electrolyte different from the separator electrolyte. In one arrangement, the first catholyte and the second catholyte are the same.

The anode may contain a material such as lithium metal, lithium alloy, lithium titanate, graphite, or silicon. The cathode active material particles may include one or more materials such as lithium iron phosphate, nickel cobalt aluminum oxide, nickel cobalt manganese oxide, lithium manganese phosphate, lithium cobalt phosphate, lithium nickel phosphate, and/or lithium manganese spinel.

In one arrangement, the cathode further contains a binder material such as polyvinylidene difluoride, polyvinylidene fluoride-co-hexafluoropropylene, polyacrylonitrile, polyacrylic acid, polyethylene oxide, carboxymethyl cellulose, styrene-butadiene rubber, or combinations thereof.

DETAILED DESCRIPTION

The preferred embodiments are illustrated in the context of polar cyclicsiloxane (PCS) compounds that can be used as non-aqueous polar cyclicsiloxane-based electrolytes or non-aqueous electrolyte additives in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein.

The molecular weights given herein are weight-averaged molecular weights.

In this disclosure, ranges of values are given for many variables. It should be understood that the possible values for any variable also include any range subsumed within the given range.

The term "solid polymer electrolyte" is used herein to mean a polymer electrolyte that is solid at battery cell operating temperatures. Examples of useful battery cell operating temperatures include room temperature (25° C.), 40° C., and 80° C.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes also employ an inactive separator material that is distinct from the liquid electrolyte. Such separators may be polymeric permeable membranes that are chemically and electrochemically stable with regard to the electrolyte and electrode materials.

In one embodiment of the invention, the general structure of a mono-functional PCS (WPCS), which has only one polar group per siloxane unit, is shown as:

where R is a saturated or unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, or anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n is any integer from 2 to 20; and x is any integer from 1 to 10. In one arrangement, the R groups are the same in all siloxane units. In another arrangement, the R groups are not the same in all siloxane units. In one arrangement, the P groups are the same in all siloxane units. In another arrangement, the P groups are not the same in all siloxane units.

The salt(s) solubility and polarity of MFPCS can be tuned by changing the R groups, the P groups, and/or the linker length (value of x). Such changes may also affect the conductivity and voltage stability of the material. For example, the higher the value of x, the longer the hydrocarbon chain length between the siloxane backbone and the polar group P. As the hydrocarbon chain length becomes longer, the concentration of P polar groups in the material decreases. As the concentration of P decreases, the solubility of lithium salt(s) also decreases. The concentration of P may also affect the viscosity and glass transition temperature ($T_g$) of the MFPCS, which affects the mobility of the salt(s). The ionic conductivity of a mixture of polar cyclicsiloxane and lithium salt(s) is related to the solubility and mobility of lithium salt(s) in the mixture. Thus, it would be useful to choose a concentration of P that optimizes both the solubility and the mobility of the salt(s). Similarly, depending on the choice of R, the concentration of P in MFPCS can be affected, which, in turn, may affect the ionic conductivity of the MFPCS.

Voltage stability of MFPCS can be tuned through careful choice of the P group(s), as some P groups are more oxidatively stable than others. Greater oxidative stability corresponds to higher voltage stability. For example, cyclic carbonates have been found to be more oxidatively stable than cyclic carbamates. In addition to changing the voltage stability, changing P may also affect the conductivity as different P groups have different abilities to solubilize salt(s) and thus affect the viscosity (or $T_g$) and mobility differently.

In another embodiment of the invention the general structure of di-functional polar cyclicsiloxane (DFPCS), which has two polar groups per siloxane unit, is shown as:

where P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n is any integer from 2 to 20; and x is any integer from 1 to 10. In one arrangement, the P groups are the same in all siloxane units. In another arrangement, the P groups are not the same in all siloxane units.

The salt(s) solubility and polarity of DFPCS can be tuned by changing the P components and/or the linker length (x). Such changes may also affect the conductivity and voltage stability of the material. For example, the higher the value of x, the longer the hydrocarbon chain length between the siloxane backbone and the polar group P. As the hydrocarbon chain length becomes longer, the concentration of P polar groups in the material decreases. As the concentration of P decreases, the solubility of lithium salt(s) also decreases. The concentration of P may also affect the viscosity and glass transition temperature ($T_g$) of the DFPCS, which affects the mobility of the salt(s). The ionic conductivity of a mixture of polar cyclicsiloxane and lithium salt(s) is related to the solubility and mobility of lithium salt(s) in the mixture. Thus, it would be useful to choose a concentration of P that optimizes both the solubility and the mobility of the salt(s).

Voltage stability of DFPCS can be tuned through careful choice of the P group(s), as some P groups are more oxidatively stable than others. Greater oxidative stability corresponds to higher voltage stability. For example, cyclic carbonates have been found to be more oxidatively stable than cyclic carbamates. In addition to changing the voltage stability, changing P may also affect the conductivity as different P groups have different abilities to solubilize salt(s) and thus affect the viscosity (or $T_g$) and mobility differently.

In another embodiment of the invention, the general structure of co-functional polar cyclicsiloxane (CFPCS), which has a mixture of mono and difunctional cyclicsiloxanes within a single cyclic structure, is shown as:

where R is a saturated or an unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n and m are both integers, and the sum of n and m is from 2 to 20; and x is any integer from 1 to 10. In one arrangement, the R groups are the same in all siloxane units. In another arrangement, the R groups are not the same in all siloxane units. In one arrangement, the P groups are the same in all siloxane units. In another arrangement, the P groups are not the same in all siloxane units.

The solubility and polarity of CFPCS can be tuned by changing the R and P components or the linker length (x). Such changes may also affect the conductivity and voltage stability of the material. For example, the higher the value of x, the longer the hydrocarbon chain length between the siloxane backbone and the polar group P. As the hydrocarbon chain length becomes longer, the concentration of P groups in the material decreases. As the concentration of P decreases, the solubility of lithium salt(s) also decreases. The concentration of P may also affect the viscosity and glass transition temperature ($T_g$) of the CFPCS, which affects the mobility of the salt(s). The ionic conductivity of a mixture of polar cyclicsiloxane and lithium salt(s) is related to the solubility and mobility of lithium salt(s) in the mixture. Thus, it would be useful to choose a concentration of P that optimizes both the solubility and the mobility of the salt(s). Similarly, depending on the choice of R, the concentration of P in CFPCS can be affected, which, in turn, may affect the ionic conductivity of the MFPCS.

In another embodiment of the invention, the general structure of mixed co-functional polar cyclicsiloxane (MCFPCS), which has a mixture of unfunctionalized and difunctional polar cyclicsiloxanes within a single cyclic structure, is shown as:

where R is a saturated or an unsaturated hydrocarbon such as methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, anthracyl; P is a polar group such as linear carbonate, cyclic carbonate, nitrile, linear sulfone, cyclic sulfone, linear sulfoxide, cyclic sulfoxide, linear phosphate, cyclic phosphate, linear phosphonate, cyclic phosphonate, linear carbamate, cyclic carbamate, linear urea, cyclic urea, linear thiourea, cyclic thiourea, linear thiocarbonate, cyclic thiocarbonate, linear thiocarbamate, cyclic thiocarbamate, linear phosphonothioate, cyclic phosphonothioate, linear phosphoramide, cyclic phosphoramide, malonate, ketone or lactone; n and m are both integers, and the sum of n and m is from 2 to 20; and x is any integer from 1 to 10. In one arrangement, the R groups are the same in all siloxane units. In another arrangement, the R groups are not the same in all siloxane units. In one arrangement, the P groups are the same in all siloxane units. In another arrangement, the P groups are not the same in all siloxane units.

The solubility and polarity of MCFPCS can be tuned by changing the R and P components or the linker length (x). Such changes may also affect the conductivity and voltage stability of the material. For example, the higher the value of x, the longer the hydrocarbon chain length between the siloxane backbone and the polar group P. As the hydrocarbon chain length becomes longer, the concentration of P groups in the material decreases. As the concentration of P decreases, the solubility of lithium salt(s) also decreases. The concentration of P may also affect the viscosity and glass transition temperature ($T_g$) of the MCFPCS, which affects the mobility of the salt(s). The ionic conductivity of a mixture of polar cyclicsiloxane and lithium salt(s) is related to the solubility and mobility of lithium salt(s) in the mixture. Thus, it would be useful to choose a concentration of P that optimizes both the solubility and the mobility of the salt(s). Similarly, depending on the choice of R, the concentration of P in MCFPCS can be affected, which, in turn, may affect the ionic conductivity of the MCFPCS.

Voltage stability of CFPCS can be tuned through careful choice of the P group(s), as some P groups are more oxidatively stable than others. Greater oxidative stability corresponds to higher voltage stability. For example, cyclic carbonates have been found to be more oxidatively stable than cyclic carbamates. In addition to changing the voltage stability, changing P may also affect the conductivity as different P groups have different abilities to solubilize salt(s) and thus affect the viscosity (or $T_g$) and mobility differently.

Some general choices for R and P groups that are suitable for WPCS, DFPCS, CFPCS, and MCFPCS structures have been listed above. The following tables list some specific examples for these groups that can be included in the embodiments of the invention. These are provided as examples only and are not intended to impose limitations on the R and P groups that may be used in the embodiments of the invention.

TABLE I

| Exemplary R Groups | |
|---|---|
| methyl | vinyl |
| ethyl | allyl |
| n-propyl | propargyl |
| isopropyl | phenyl |
| tert-butyl | 4-vinylbenzene |
| 2-ethylhexyl | benzyl |
| n-octyl | napthyl |
| acrylate | TEMPO |
| methacrylate | ferrocene |
| bromoisobutryl | anthracyl |

TABLE II

| Exemplary P Groups | |
|---|---|
| linear and cyclic carbonate | ketone |
| linear and cyclic sulfoxide | lactone |
| linear and cyclic sulfone | imidazolium |
| linear and cyclic phosphate | pyridinium |
| linear and cyclic carbamate | piperidinium |
| linear and cyclic phosphonate | ammonium |
| linear and cyclic urea | linear and cyclic thiourea |
| linear and cyclic thiocarbonate | linear and cyclic thiocarbamate |

TABLE II-continued

Exemplary P Groups

| | |
|---|---|
| linear and cyclic phosphonothioate | linear and cyclic phosphoramides |
| phosphonium | nitrile |
| carboxylate | sulfate |
| sulfonate | ester |

Polyalkoxysiloxane Polymer Electrolytes and Electrolyte Additives

In one embodiment of the invention polar cyclicsiloxane materials combined with appropriate electrolyte salts (polar cyclicsiloxane/electrolyte salt) are used as electrolytes. In another embodiment of the invention, polar cyclicsiloxane/electrolyte salt materials are used as additives in other electrolytes. Although many of the embodiments of the invention described herein include lithium salts, there are no particular restrictions on the electrolyte salt that can be used in the polar cyclicsiloxane electrolytes. Any electrolyte salt that includes the ion identified as the most desirable charge carrier for the application can be used. It is especially useful to use electrolyte salts that have a large dissociation constant within the electrolyte. When an electrolyte is used in the cathode, it can be referred to as a catholyte.

In various embodiments of the invention, for various cell electrochemistries, electrolytes are made by combining polar cyclicsiloxane materials with salts that include the metal that is the basis of the cell. Possible electrochemistries include, but are not limited to, those based on Li, Na, K, Mg, Ca, Al, Ag, Ba, or Pb. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$.

Examples of appropriate salts for any electrolyte disclosed herein include, but are not limited to metal salts selected from the group consisting of chlorides, bromides, sulfates, nitrates, sulfides, hydrides, nitrides, phosphides, sulfonamides, triflates, thiocyanates, perchlorates, borates, or selenides of alkali metals such as lithium, sodium, potassium and cesium, or silver, barium, lead, calcium, ruthenium, tantalum, rhodium, iridium, cobalt, nickel, molybdenum, tungsten or vanadium. Examples of specific lithium salts include LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, lithium alkyl fluorophosphates (LiFAP), lithium oxalatoborate, as well as other lithium bis(chelato)borates having five to seven membered rings, lithium bis(trifluoromethane sulfone imide) (LiTFSI), $LiPF_3(C_2F_5)_3$, $LiPF_3(CF_3)_3$, $LiB(C_2O_4)_2$, LiOTf, $LiC(Tf)_3$, lithium bis-(oxalato)borate (LiBOB), lithium-bis (perfluoroethylsulfonyl)imide (LiBETI), lithium difluoro(oxalato)borate (LiDFOB), lithium tetracyanoborate (LiTCB), and mixtures thereof. In other arrangements, for other electrochemistries, electrolytes are made by combining the polar cyclicsiloxane materials with various kinds of non-lithium salts. For example, non-lithium salts such as salts of aluminum, sodium, and magnesium can be used with their corresponding metals. Specific examples of such salts include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$. Concentration of metal salts in the electrolytes disclosed herein range from 5 to 50 wt %, 5 to 30 wt %, 10 to 20 wt %, or any range subsumed therein.

There is no particular restriction on the kinds of electrolytes that can contain additives based on polar cyclicsiloxane materials combined with electrolyte salts. It is especially useful if the polar cyclicsiloxane is miscible with the host electrolyte.

In one embodiment of the invention, polar cyclicsiloxane/electrolyte salt materials are used as an additive in a solid polymer electrolyte. The solid polymer electrolyte can be any such electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. The linear polymers can also be used in combination as graft copolymers with backbone polymers such as polysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. In addition to block copolymers, the polymer electrolyte may have other architectures such as branched, hyperbranched, random copolymers, graft copolymers, or homopolymers consisting of the ionically conductive polymers mentioned above.

Cell Designs that Use Polar Cyclicsiloxanes

In some embodiments of the invention, malonate-based polyester materials combined with appropriate electrolyte salts (malonate polyester/electrolyte salt) are used as electrolytes in the cathode or in the separator in a battery cell. In other embodiments of the invention malonate polyester/electrolyte salt materials are used as additives in other electrolytes that can be used in the cathode or in the separator in a battery cell. There is no particular restriction on the kinds of host electrolytes in which the invention malonate polyester/electrolyte salt materials can be used as an additive. It is especially useful if the malonate polyester is miscible with the host electrolyte.

Figure 1:
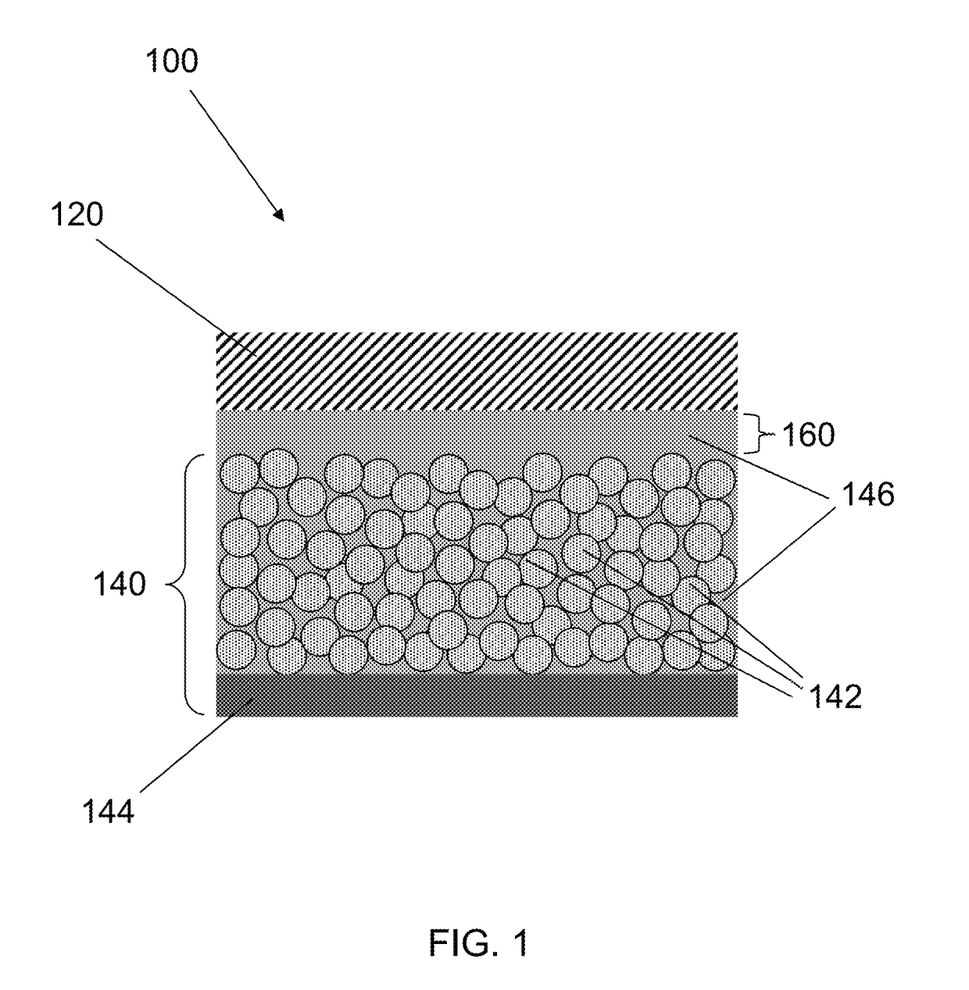
FIG. 1 is a schematic illustration of one configuration of a lithium battery cell that contains a catholyte, according to an embodiment of the invention.
Figure 2:
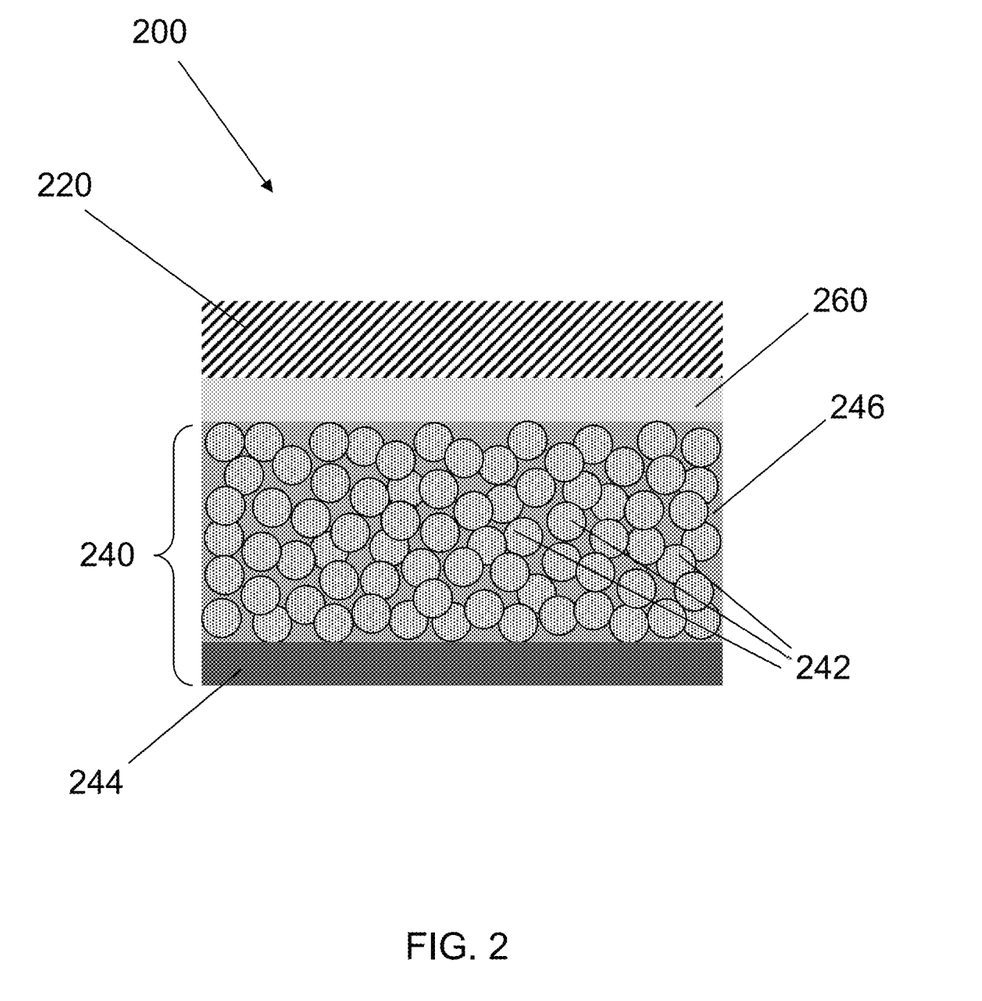
FIG. 2 is a schematic illustration of another configuration of a lithium battery cell that contains a catholyte, according to an embodiment of the invention.

In one embodiment of the invention, a lithium battery cell 100 has an anode 120 that is configured to absorb and release lithium ions, as shown in FIG. 1. The anode 120 may be a lithium or lithium alloy foil, or it may be made of some other material into which lithium ions can be absorbed such as graphite or silicon. Other choices for the anode 120 include, but are not limited to, lithium titanate and lithium-silicon alloys. The lithium battery cell 100 also has a cathode 140 that includes cathode active material particles 142, an electronically-conductive additive such as carbon black (not shown), a current collector 144, a catholyte (electrolyte in the cathode) 146, and an optional binder (not shown). In one arrangement, the catholyte 146 includes any of the polar cyclicsiloxane electrolytes disclosed above. In another arrangement, the catholyte 146 includes some other electrolyte that contains a polar cyclicsiloxane/lithium salt additive, as disclosed above. There is a separator region 160 between the anode 120 and the cathode 140. The catholyte 146 extends all the way into the separator region 160 and facilitates movement of lithium ions back and forth between the anode 120 and the cathode 140 as the cell 100 cycles. The electrolyte 146 in the separator region 160 and the catholyte 146 in the cathode 140 are the same In another embodiment of the invention, the polar cyclicsiloxane/lithium salt electrolytes disclosed herein are used as catholytes in the cathode in a lithium battery cell. With reference to FIG. 2, a lithium battery cell 200 has an anode 220 that is configured to absorb and release lithium ions. The anode 220 may be a lithium or lithium alloy foil or it may be made of a material into which lithium ions can be absorbed such as graphite or silicon. Other choices for the anode 220 include, but are not limited to, lithium titanate, and lithium-silicon alloys. The lithium battery cell 200 also has a cathode 240 that includes cathode active material particles 242, an electronically-conductive additive such as carbon black (not shown), a current collector 244, a catholyte 246, and an optional binder (not shown). In one arrangement, the catholyte 246 includes any of the polar cyclicsiloxane electrolytes disclosed above. In another arrangement, the catholyte 246 includes some other electrolyte that contains a polar cyclicsiloxane/lithium salt additive, as disclosed above. There is a separator region 260 between the anode 220 and the cathode 240. The separator region 260 contains an electrolyte that facilitates movement of lithium ions back and forth between the anode 220 and the cathode 240 as the cell 200 cycles. The separator region 260 may include any electrolyte that is suitable for such use in a lithium battery cell. In one arrangement, the separator region 260 contains a porous plastic material (not shown) that is soaked with a liquid electrolyte. In another arrangement, the separator region 260 contains a viscous liquid or gel electrolyte. In another arrangement, the separator region 260 contains a solid polymer electrolyte. In another arrangement, the separator region 260 contains a solid, gel, or liquid polymer electrolyte in which the cyclicsiloxane is immiscible.

A solid polymer electrolyte for use in separator region 260 can be any electrolyte that is appropriate for use in a Li battery. Of course, many such electrolytes also include electrolyte salt(s) that help to provide ionic conductivity. Examples of such solid polymer electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more polyalkoxysiloxanes, as disclosed herein. The ionically-conductive phase may include such linear polymers as components of graft or comb copolymers with backbone polymers such as polysiloxanes, polyalkoxysiloxanes, polyphosphazines, polyethers, polydienes, polyolefins, polyacrylates, polymethacrylates, and combinations thereof. Pendants in such graft copolymers may include any of oligoethers, substituted oligoethers, nitrile groups, sulfones, thiols, polyethers, polyamines, polyimides, polyamides, alkyl carbonates, polynitriles, other polar groups, and combinations thereof.

The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. In addition to block copolymers, the solid polymer electrolyte may have other architectures. Examples of such architectures include, but are not limited to, branched polymers, hyperbranched polymers, random copolymers, graft copolymers, and homopolymers that include the ionically conductive polymers mentioned above.

The solid polymer electrolyte may be a crosslinked or non-crosslinked polymer material and may contain one or more polymers such as polyethers, polyamines, polyimides, polyamides, poly alkyl carbonates, polysulfones, polynitriles, perfluoro polyethers, fluorocarbon polymers substituted with high dielectric constant groups such as nitriles, carbonates, and sulfones, and combinations thereof.

Figure 3:
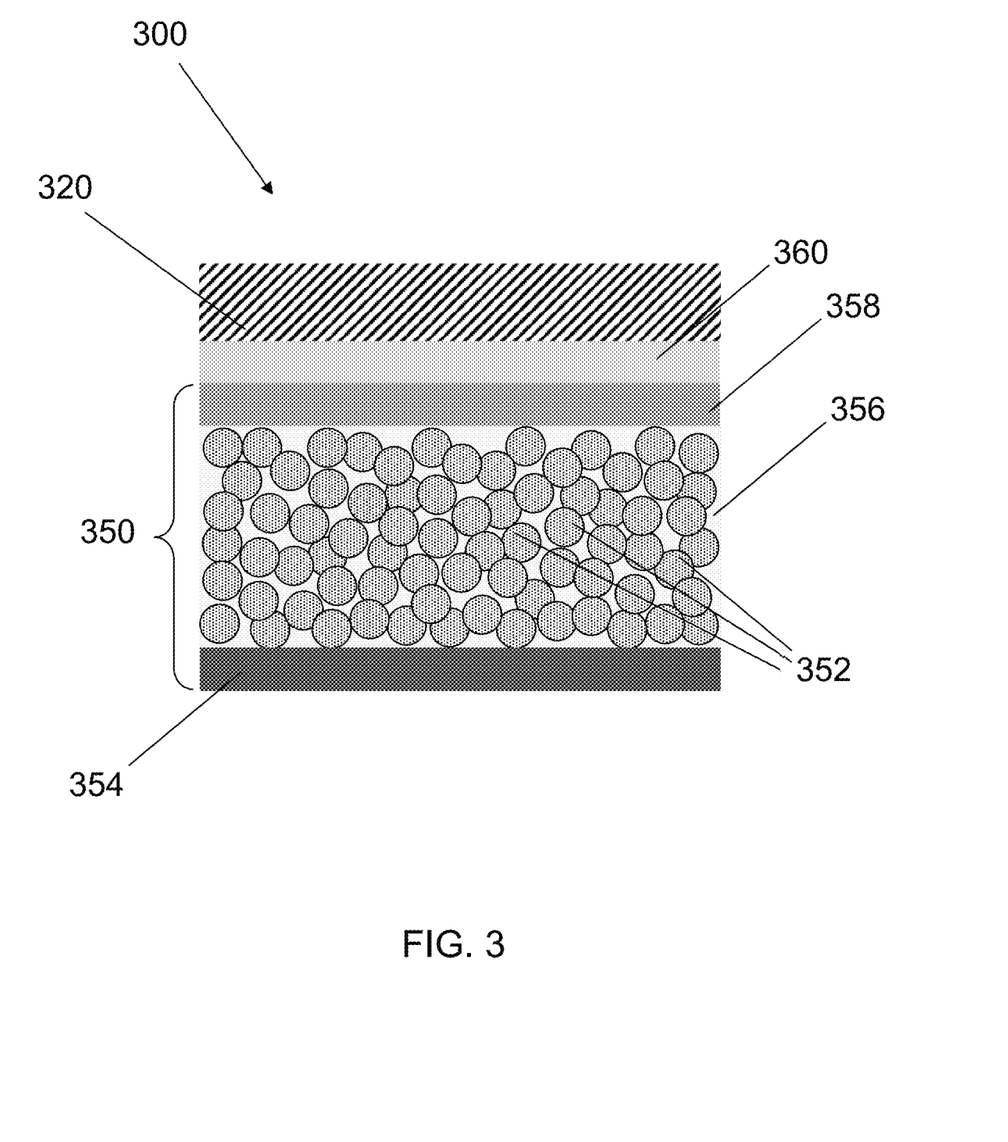
FIG. 3 is a schematic illustration of another configuration of a lithium battery cell that contains a catholyte and a cathode overlayer, according to an embodiment of the invention.

In another embodiment of the invention, a battery cell with a third configuration is described. With reference to FIG. 3, a lithium battery cell 300 has an anode 320 that is configured to absorb and release lithium ions. The anode 320 may be a lithium or lithium alloy foil or it may be made of a material into which lithium ions can be absorbed such as graphite or silicon. Other choices for the anode 320 include, but are not limited to, lithium titanate, and lithium-silicon alloys. The lithium battery cell 300 also has a cathode 350 that includes cathode active material particles 352, an electronically-conductive additive (not shown), a current collector 354, a catholyte 356, an optional binder (not shown), and an overcoat layer 358. Both the electrolyte in the overcoat layer 358 and the catholyte 356 contain any of the polar cyclicsiloxane electrolytes or polar cyclicsiloxane/lithium salt additives in a host electrolyte disclosed herein. It is especially useful if the overcoat layer 358 is a solid electrolyte layer. In one arrangement, the electrolyte in the overcoat layer 358 and the catholyte 356 are the same. In another arrangement, the electrolyte in the overcoat layer 358 and the catholyte 356 are different. There is a separator region 360 between the anode 320 and the cathode 350. The separator region 360 contains an electrolyte that facilitates movement of lithium ions back and forth between the anode 320 and the cathode 350 as the cell 300 cycles. The separator region may include any electrolyte that is suitable for such use in a lithium battery cell, as described above.

With respect to the embodiments described in FIGS. 1, 2, and 3, suitable cathode active materials include, but are not limited to, LFP (lithium iron phosphate), LMP (lithium metal phosphate in which the metal can be Mn, Co, or Ni), NCA (lithium nickel cobalt aluminum oxide), NCM (lithium nickel cobalt manganese oxide) high energy NCM, lithium manganese spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP (polyvinylidene fluoride-co-hexafluoropropylene), PAN (polyacrylonitrile),

PAA (polyacrylic acid), PEO (polyethylene oxide), CMC (carboxymethyl cellulose), and SBR (styrene-butadiene rubber).

EXAMPLES

The following examples provide details relating to synthesis of PCS materials in accordance with the present invention. It should be understood the following is representative only, and that the invention is not limited by the detail set forth in these examples.

Synthesis of DFPCS

A representative example for synthesis of DFPCS 1 with nitrile units as polar groups is shown below. The synthesis involves hydrolysis followed by polycondensation of dichlorodi(cyanopropyl)siloxane in presence of pyridine as a base.

In one example, 40 g (170 mmol) of bis(cyanopropyl) dichlorosilane (BCPDS) was charged under argon into an oven-dried flask fitted with an argon inlet, and an outlet tube feeding into a bubbler connected to a 10 M KOH (aq) solution. The reagent was then cooled to 0° C. in an ice bath. Then a 1:2 mixture of water/pyridine (5.8 mL/52 mL; 320 mmol/640 mmol) was added dropwise into stirred BCPDS. The mixture was stirred for two hours in the ice bath and then quenched with ethyl acetate. Salt byproducts were then filtered out, and the filtrate concentrated by rotovaporation. The resulting oil was washed by dispersion in isopropyl alcohol (~300 mL) and stirred vigorously for an hour. The dispersion was then allowed to settle over several hours, after which the isopropyl alcohol was decanted off. The wash was repeated two more times. Then the product was collected and dried under vacuum to yield 21.1 g (73.2%) of pure DFPCS 1 product. Gel permeation chromatography showed the weight-average molecular weight (Mw) of the resulting product to be 725 Da.

The following NMR characterization was obtained for the DFPCS 1 product.

$^1$H-NMR (400 MHz, CD$_3$CN) δ 2.63-2.18 (m, 4H), 1.87-1.43 (m, 4H), 0.88-0.51 (m, 4H).

$^{13}$C-NMR (101 MHz, CD$_3$CN) δ 121.13, 121.08, 121.02, 120.94, 20.83-20.69 (b), 20.64, 20.53, 20.30-20.24 (b), 19.86, 16.07-15.85 (b), 15.70, 15.48, 15.39-15.31 (b).

$^{29}$Si-NMR (79 MHz, CD$_3$CN) δ −10.90, −16.00, −21.84, −24.29--24.43 (b).

Measurement of Ionic Conductivity for DFPCS with Electrolyte Salt

Figure 4:
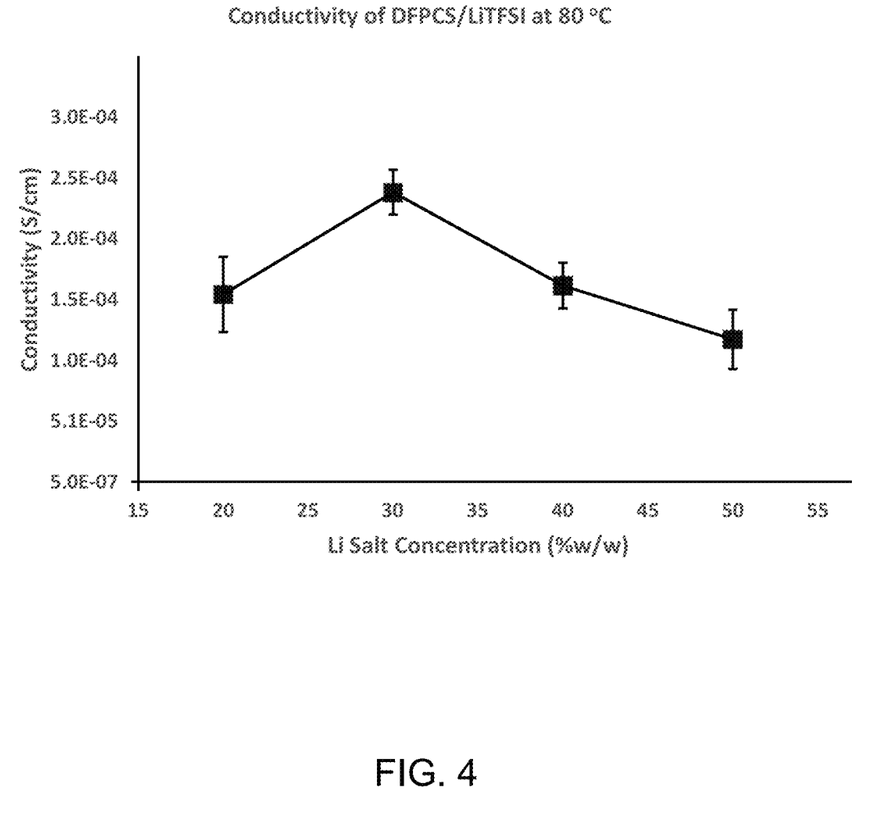
FIG. 4 is a graph that shows ionic conductivities for di-functional polar cyclicsiloxane (DFPCS) over a range of LiTFSI concentrations.

Solutions of LiTFSI (20 thru 50 wt %) in DFPCS (DFPCS 1 product as synthesized above) were prepared in a glove box, drop-cast onto a glass slide, and dried at 50° C. under dry conditions. Then the glass slides containing the DFPCS-LITFSI were dried in a high vacuum oven maintained at 70° C. for a period of 16 hrs. Symmetric cells containing the DFPCS-LiTFSI mixtures and stainless steel electrodes were assembled. Impedance measurements were made on these cells at 80° C. Ionic conductivities were calculated from the impedance measurements and are shown in the graph in FIG. 4. The DFPC-LiTFSI electrolyte had its highest conductivity ($2.5 \times 10^{-4}$ S/cm) with 30 wt % LITFSI.

Figure 5:
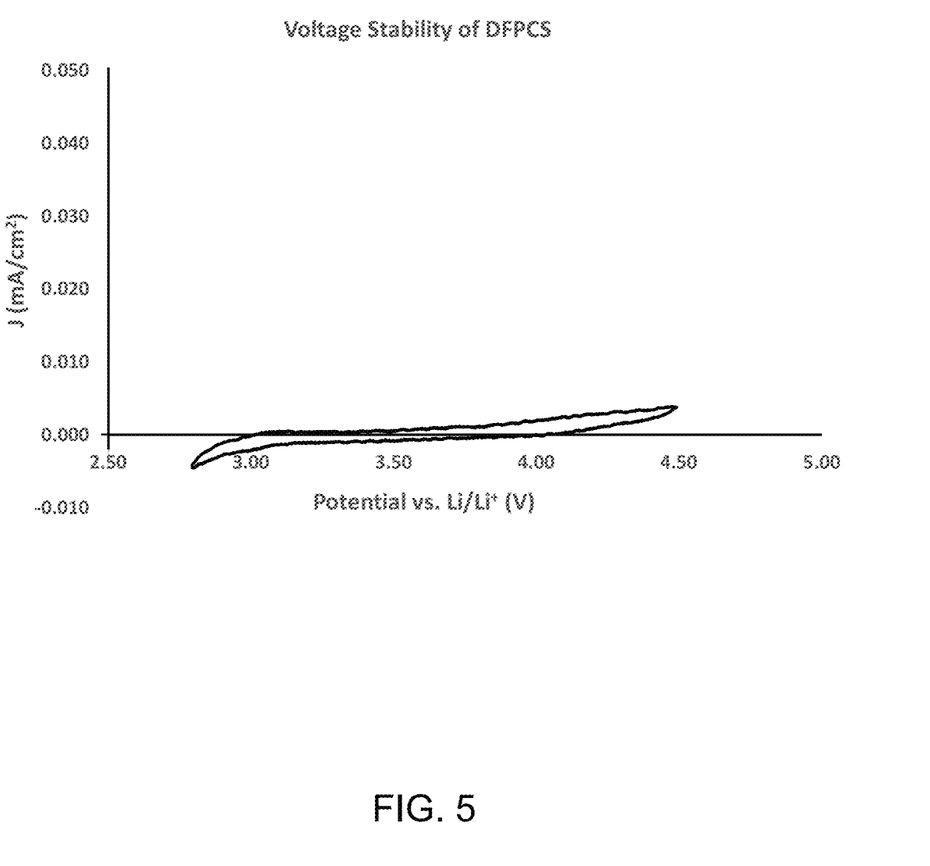
FIG. 5 shows a cyclic voltammetry trace for di-functional polar cyclicsiloxane with 0.1M LiBF$_4$ in propylene carbonate as supporting electrolyte.

Cyclic Voltammetry of DFPCS:

The electrochemical stability of DFPCS 1 with 0.1M LiBF$_4$ was also tested using cyclic voltammetry (CV) using a three-electrode configuration. The working electrode was a Pt button electrode; the counter electrode was a Pt wire, and a quasi-reference electrode was constructed from an Ag wire dipped in a 10 mM AgNO$_3$ in 0.1 M tetrabutylammonium hexafluorophosphate solution in glass tubing with an attached Vycor frit. The quasi-reference electrode was calibrated against a 10 mM ferrocene solution in 0.1 M lithium tetrafluoroborate in propylene carbonate, to give E$_{ox}$ (ferrocene/ferrocenium)=0.058 V vs. Ag/Ag$^+$). The same ferrocene solution was also used to calibrate a lithium reference electrode (E$_{ox}$ (ferrocene/ferrocenium)=3.35-3.39 V vs. Li/Li$^+$). Cyclic voltammetry was performed on 10 wt % solutions of DFPCS 1 in 0.1 M LiBF$_4$ in propylene carbonate at a scan rate of 5 mV/s over the range of 2.8 to 4.5 V vs. Li/Li$^+$. The CV trace for DFPCS is shown in FIG. 5.

The CV trace in FIG. 5 indicates no oxidation reaction below 4.5 V vs. Li/Li$^+$, which makes DFPCS 1 a good candidate for use with high voltage cathode materials such as NCA and NCM. Furthermore, a complete overlap of CV traces over five cycles was observed, which indicates high stability of DFPCS 1 to repeated electrochemical cycling.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. An electrochemical cell, comprising:
   an anode configured to absorb and release lithium ions;
   a cathode comprising a positive electrode comprising a positive electrode active material and a first catholyte comprising an electrolyte material comprising a polar cyclic siloxane with the following structure:

wherein:
   R is a saturated or unsaturated hydrocarbon and is selected from the group consisting of methyl, ethyl, n-propyl, isopropyl, tertiary butyl, n-hexyl, 2-ethyl hexyl, n-octyl, vinyl, allyl, propargyl, phenyl, 4-vinylbenzene, benzyl, napthyl, and anthracyl;
   P is a polar group and is selected from the group consisting of linear carbonate, cyclic carbonate, nitrile, linear sulfonyl, cyclic sulfonyl, linear sulfinyl, cyclic sulfinyl, linear phosphate, cyclic phosphate, linear phosphonate group, cyclic phosphonate group, linear carbamoyl, cyclic carbamoyl, linear urea, cyclic urea, linear thiourea, cyclic thiourea, linear thiocarbonate, cyclic thiocarbonate, linear thiocarbamoyl, cyclic thiocarbamoyl, linear phosphonothioate group, cyclic phosphonothioate group, linear phosphoramide group, cyclic phosphoramide group, malonate, ketone and lactone group;
n is any integer from 2 to 20; and
x is any integer from 1 to 10; and
an electrolyte salt; and
optional electronically-conductive additive;
a current collector adjacent to an outside surface of the cathode;
a separator region between the anode and the cathode, the separator region comprising a separator electrolyte configured to facilitate movement of lithium ions back and forth between the anode and the cathode; and
an overlayer between the cathode and the separator region, the overlayer comprising a second catholyte, the second catholyte comprising a solid polymer electrolyte, wherein the solid polymer electrolyte is different from the separator electrolyte.

2. The positive electrode of claim 1 wherein the positive electrode active material is selected from the group consisting of lithium nickel cobalt aluminum oxide and lithium nickel cobalt manganese oxide.

3. The electrochemical cell of claim 1 wherein the first catholyte further comprises a solid polymer electrolyte.

4. The electrochemical cell of claim 1 wherein the first catholyte and the separator electrolyte are the same.

5. The electrochemical cell of claim 1 wherein the separator electrolyte comprises a solid polymer electrolyte.

6. The electrochemical cell of claim 1 wherein the first catholyte and the second catholyte are the same.

7. The electrochemical cell of claim 1 wherein the anode comprises a material selected from the group consisting of lithium metal, lithium alloy, lithium titanate, graphite, and silicon.

8. The electrochemical cell of claim 1 wherein the positive electrode active material comprises one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel.

9. The electrochemical cell of claim 1 wherein the cathode further comprises a binder material selected from the group consisting of polyvinylidene difluoride, polyvinylidene fluoride-co-hexafluoropropylene, polyacrylonitrile, polyacrylic acid, polyethylene oxide, carboxymethyl cellulose, styrene-butadiene rubber, and combinations thereof.

10. An electrochemical cell, comprising:
an anode configured to absorb and release lithium ions;
a cathode comprising a positive electrode comprising a positive electrode active material and a first catholyte comprising an electrolyte material comprising a polar cyclic siloxane with the following structure:

wherein:
P is a polar group and is selected from the group consisting of linear carbonate, cyclic carbonate, nitrile, linear sulfonyl, cyclic sulfonyl, linear sulfinyl, cyclic sulfinyl, linear phosphate, cyclic phosphate, linear phosphonate group, cyclic phosphonate group, linear carbamoyl, cyclic carbamoyl, linear urea, cyclic urea, linear thiourea, cyclic thiourea, linear thiocarbonate, cyclic thiocarbonate, linear thiocarbamoyl, cyclic thiocarbamoyl, linear phosphonothioate group, cyclic phosphonothioate group, linear phosphoramide group, cyclic phosphoramide group, malonate, ketone and lactone group;
n is any integer from 2 to 20; and
x is any integer from 1 to 10; and
an electrolyte salt; and
optional electronically-conductive additive;
a current collector adjacent to an outside surface of the cathode;
a separator region between the anode and the cathode, the separator region comprising a separator electrolyte configured to facilitate movement of lithium ions back and forth between the anode and the cathode; and
an overlayer between the cathode and the separator region, the overlayer comprising a second catholyte, the second catholyte comprising a solid polymer electrolyte, wherein the solid polymer electrolyte is different from the separator electrolyte.

11. The electrochemical cell of claim 10 wherein the first catholyte and the second catholyte are the same.

12. The electrochemical cell of claim 10 wherein the first catholyte further comprises a solid polymer electrolyte.

13. The electrochemical cell of claim 10 wherein the first catholyte and the separator electrolyte are the same.

* * * * *